A. W. BUCHANAN.
STALK CUTTER.
APPLICATION FILED JAN. 27, 1911.

1,007,916.

Patented Nov. 7, 1911.

WITNESSES:
L. E. Noack.
W. S. Castle

INVENTOR
A. W. Buchanan
BY
ATTORNEY

UNITED STATES PATENT OFFICE.

AMOS W. BUCHANAN, OF BRYAN, TEXAS.

STALK-CUTTER.

1,007,916.  Specification of Letters Patent.  Patented Nov. 7, 1911.

Application filed January 27, 1911. Serial No. 604,946.

*To all whom it may concern:*

Be it known that I, AMOS W. BUCHANAN, citizen of the United States, residing at Bryan, in the county of Brazos and State of Texas, have invented certain new and useful Improvements in Stalk-Cutters, of which the following is a specification.

This invention pertains to that class of stalk cutters employing rotating breaking members.

Heretofore it has been the practice to cut off stalks just above or below the surface of the ground thus leaving the roots of the plant buried and making it necessary to either pry up or plow up said roots before the ground could again be used for planting. The roots of some plants, particularly cotton, are very tenacious and in many cases it is almost impossible to remove the same with the ordinary plow after the stalks have been cut and the roots allowed to remain in the ground.

It is the object of this invention to provide a machine equipped with a peculiar form of plow shovel or root digger whereby the plant is "uprooted" before the stalk is cut and then supported in position to be operated upon by a rotating stalk breaker.

A further object resides in the provision of a rotating breaker having a plurality of superposed horizontal breaking blades adapted to pass between a plurality of rigidly supported horizontal breaking bars whereby the stalk is broken or cut into several pieces and left on the surface of the ground with the roots; and also in the provision of a guide whereby the stalks are supported in an upright position in the path of the rotating blades by which they will be brought into contact with the breaking bars.

Among other objects is the production of a machine which will be strong, durable, efficient, and simple and comparatively inexpensive to construct, also one in which the several parts will not be likely to get out of working order.

Figure 1:
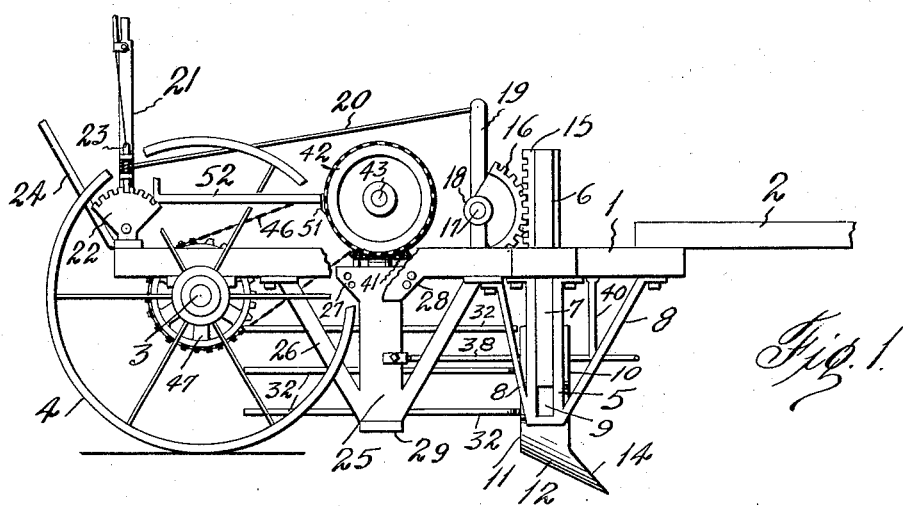
Figure 2:
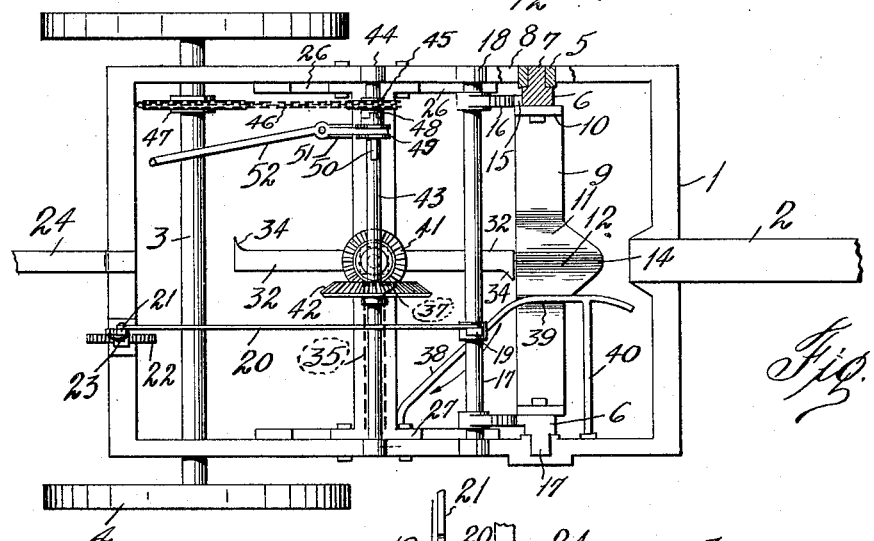
Figure 3:
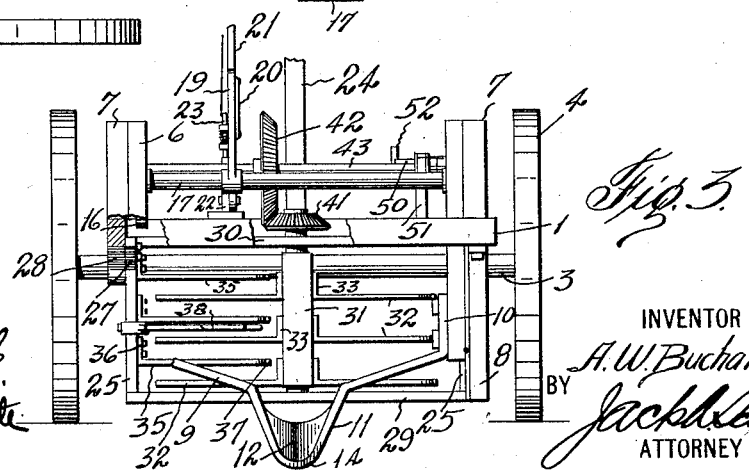

With the above and other objects in view the invention has relation to certain novel features of construction and operation, an example of which is described in the following specification and illustrated in the accompanying drawings, wherein:

Figure 1 is a side elevation of the machine with parts of the machine broken away to illustrate underlying constructions, Fig. 2 is a plan view, and Fig. 3 is a front elevation.

In the drawings the numeral 1 designates a rectangular frame provided with a tongue or other draft connection 2 at its forward end and supported near its rear end on a revolving axle 3 having ground wheels 4 fixed on its ends. A pair of depending guide hangers 5 are secured to the underside of the frame near the forward end in opposed relation. As shown in Figs. 2 and 3 these hangers extend inward a short distance beyond the inner sides of the frame and form bearings for the shouldered portions of vertical standards 6 which are provided with outwardly directed shoes 7 adapted to slide in the hangers and slotted portions of the frame. The hangers are held in position by upwardly extending diagonal braces 8.

A transverse yoke 9 is provided with upturned ends 10 by which it is secured to the inner sides of the standards 6. This yoke slants downward toward its center as is best shown in Fig. 3 and depends below the standard as will be seen by observing Figs. 1 and 3. At the central portion of the yoke a V-shaped shovel or digger 11 is provided. This shovel has its bottom 12 inclining downward from its rear end and terminating at its forward end in an elongated point 14.

It is obvious that as the machine is drawn forward the point 14 will enter the ground and pass under the roots of the plants which will ride upward on the inclined bottom 12 of the shovel and as the machine continues forward the shovel will pass from under the roots leaving the same and the entire plant resting on the ground. By observing Fig. 3 it will be apparent that there is sufficient space at the upper end of the shovel to permit a free passage of the roots and any adhering earth.

The hangers and standards while holding the yoke and shovel substantially rigid, permit a vertical adjustment whereby the depth to which the point 14 enters the ground may be regulated. The adjustment is accomplished by means of vertical gear bars 15 provided on the rear sides of the post 6 and meshing with segmental gears 16 fixed on a transverse shaft 17 mounted to rotate in bearings 18 secured on the frame. A lever arm 19 is fastened on said shaft and has connection at its upper end with a rod 20 which extends rearwardly to an adjusting lever 21. The adjusting lever is pivoted on the side of a segment 22 fastened on the rear end of the frame adjacent a seat post 24. The lever has a spring pressed plunger arrangement 23 engaging the teeth of the segment whereby the lever may be locked in position. By swinging the lever 21 the shaft 17 is rocked, the gears 16 swung and the standards raised and lowered whereby the yoke and shovel are adjusted.

Near the center of the frame a vertical side bar 25 depends from each side and each bar is provided with diagonal braces 26. These bars are secured to the inner sides of the frame and have lugs 27 fastened to bosses 28 depending from the frame which is best shown in Fig. 1 where the frame is broken away and also in Fig. 3. The lower ends of the side bars are connected by a transverse bar 29. At their upper ends the side bars are connected by another transverse bar 30 and in this way a rigid frame is supported under the main frame 1. At the center of the machine a vertical shaft 31 preferably having flat sides is rotatably supported by the bars 29 and 30. To the opposite sides of this shaft 31 breaking or cutting members or blades 32 are attached. These blades extend horizontally and have their inner ends turned upward at 33 for securing them to the shaft. It is to be understood that the blades project from only two sides of the shaft and those on one side are in horizontal alinement with those on the other side. The blades on each side are superposed and spaced apart and each blade at its outer end has a hook-like projection 34 extending from the operating edge of the blade and carried in advance thereof. When the blades are rotated these projections 34 act to prevent the stalks from being thrown off of the ends of the blades as will be apparent.

From one of the side bars 25 a plurality of breaking bars or fingers 35 extend inward horizontally and have their free ends terminating near the shaft 31 as is best shown in Fig. 3. These fingers have upturned ends 36 by which they are secured to the side bar. The fingers are spaced apart similar to the blades and disposed so that as the blades pass therebetween the adjacent fingers to each blade will be equidistant therefrom, a blade passing under each finger. Each finger has at its free end a forwardly extending projection 37 similar to the projections 34 which act to prevent stalks from being thrown off the fingers and against the shaft 31. When the blades are rotated the stalks which have been guided into their path are thrown against or carried to the fingers and the projections 34 and 37 coöperate in maintaining the stalks in an upright position while the same are being broken or cut.

By observing Figs. 1 and 2 it will be seen that the ends of the blades in passing the shovel swing almost over the same so that when the plants are uprooted and the shovel passes from under the same, the stalks will be left standing in the path of said blades. It is evident that some means for maintaining the stalks in an upright position and preventing the rotating blades from overturning the same, also for guiding the stalks to the fingers must be provided. For this purpose a guide rail 38 is provided. The rear end of this rail is secured to the side bar 25 which carries the fingers and the rail is carried forward horizontally and directed inward toward the shovel. The rail is disposed about midway of the bar 25 and the blades swing over and under the same. Over the shovel the rail is bent and directed forward as shown at 39 in Fig. 2. The forward end of the rail is supported by an angular bracket 40 having its upper end fastened to the inner side of the frame 1. It is apparent that the blades will have a tendency to throw the stalks against the rail which will guide them rearwardly to the fingers where they will be broken or cut into comparatively short pieces as the blades pass between the fingers.

For rotating the shaft 31 the latter is extended above the bar 30 and has fixed thereon, a bevel pinion 41 which meshes with a bevel gear 42 fixed on a transverse shaft 43 supported above the frame in bearing standards 44 secured on the frame. Near one end of the said shaft a sprocket 45 is loosely mounted and is driven by a chain 46 passing about a sprocket 47 fixed on the axle 3 within the frame. The sprocket 45 has a clutch hub 48 adapted to be engaged by a clutch sleeve 49 slidable on the shaft 43 and caused to turn therewith by a spline 50. The clutch sleeve is thrown into and out of engagement with the clutch hub by means of a horizontal lever 52 forked about the sleeve and pivoted on a bracket 51 extending upward from the bar 30. The lever 52 is bent toward the center of the machine and has its free end upturned and terminating near the rear of the frame whereby it may be operated by the foot of the driver.

What I claim, is:

1. In a stalk cutter, the combination of a frame supported on ground wheels, a plurality of fixed horizontal breaking fingers carried by the frame, a rotating breaking member mounted in the frame having a plurality of horizontal breaking blades arranged to pass between the fingers, a driving connection in gear with the breaking member, and a plow supported on the frame in advance of the breaking member.

2. In a stalk cutter, the combination of a frame supported on ground wheels, a plurality of fixed horizontal breaking fingers carried by the frame, a rotating breaking member mounted in the frame having a plurality of horizontal breaking blades arranged to pass between the fingers, a driving connection in gear with the breaking member, a plow supported on the frame in advance of the breaking member and a guide extending in the path of the blades of the breaking member from a point over the plow shovel to a point adjacent the fingers.

3. In a stalk cutter, the combination with a frame mounted on ground wheels, of a yoke supported for vertical adjustment at the forward end of the frame, a plow shovel having an inclined bottom provided at the central portion of the yoke, a plurality of spaced horizontal fingers carred by the frame in rear of the yoke, a rotatable breaking member having a plurality of spaced horizontal blades disposed to pass between the fingers, a driving shaft mounted over the breaking member, and driving connections between the shaft and the breaking member.

4. In a stalk cutter, the combination with a frame mounted on ground wheels, of a yoke supported for vertical adjustment at the forward end of the frame, a plow shovel having an inclined bottom provided at the central position of the yoke, a plurality of spaced horizontal fingers carried by the frame in rear of the yoke, a rotatable breaking member having a plurality of spaced horizontal blades disposed to pass between the fingers, a driving shaft mounted over the breaking member, driving connections between the shaft and the breaking member, and a guide member extending from a point over the plow shovel rearwardly and laterally to a point adjacent the fingers.

5. In a stalk cutter, the combination of a frame mounted on ground wheels and having a driving axle, a pair of hangers depending from the frame near its forward end, standards movable in the hangers, gear and rack mechanism for vertically adjusting the standards, a yoke secured to the standards and extending transversely under the frame, a plow shovel provided at the central portion of the yoke and having an upwardly and rearwardly inclined bottom, side bars depending from the frame in rear of the hangers, separated transverse bars connecting the side bars, a plurality of superposed horizontal fingers spaced apart and extending transversely of the frame from one of the side bars, a vertical shaft rotatably mounted between the transverse bars, a plurality of superposed horizontal blades spaced apart and extending from opposite sides of the shaft, the blades being disposed so as to pass between the fingers, a guard rail bent at an angle and extending in the path of the blades from a point over the plow shovel to the side bar supporting the fingers, a shaft supported above the frame transversely, driving connections between the transverse shaft and the vertical shaft, and other driving connections between the transverse shaft and the axle of the frame.

In testimony whereof I have signed my name to this specification in the presence of two subscribing witnesses.

AMOS W. BUCHANAN.

Witnesses:
W. J. BULLOCK,
LOUIS HOWE.

Copies of this patent may be obtained for five cents each, by addressing the "Commissioner of Patents, Washington, D. C."